(12) United States Patent
Guerin et al.

(10) Patent No.: US 7,177,501 B2
(45) Date of Patent: Feb. 13, 2007

(54) OPTICAL CHROMATIC DISPERSION COMPENSATION MODULE

(75) Inventors: Jean-Jacques Guerin, Antony (FR); Olivier Durand, Ste Genevieve des Bois (FR); Fabrice Poussiere, Massy (FR)

(73) Assignee: Alcatel, Paris (FR)

( * ) Notice: Subject to any disclaimer, the term of this patent is extended or adjusted under 35 U.S.C. 154(b) by 120 days.

(21) Appl. No.: 11/098,397

(22) Filed: Apr. 5, 2005

(65) Prior Publication Data
US 2005/0220409 A1 Oct. 6, 2005

(30) Foreign Application Priority Data
Apr. 6, 2004 (FR) .................................. 04 50681

(51) Int. Cl.
*G02B 6/34* (2006.01)
(52) U.S. Cl. ...................................................... 385/37
(58) Field of Classification Search .................... None
See application file for complete search history.

(56) References Cited
U.S. PATENT DOCUMENTS 6,633,702 B2 * 10/2003 Hoshino ........................ 385/37
2005/0084209 A1 * 4/2005 Bae et al. ..................... 385/27

FOREIGN PATENT DOCUMENTS
EP  1 271 199 A  1/2003

OTHER PUBLICATIONS

T. Imai et al. Dispersion tuning of a linearly chirped fiber Bragg grating without a center wavelength shift by applying a strain gradient. IEEE Photonics Technology Letters, vol. 10, No. 6, pp. 845-847, Jun. 1998.*
S. Chung et al. Group delay control of super-imposed fiber gratings using a two-column system mounted on a rotable disk. IEEE Photonics Technology Letters, vol. 16, No. 1, pp. 153-155, Jan. 2004.*
J. Kim et al. Effectively tunable dispersion compensation based on chirped fiber Bragg gratings without central wavelength shift. IEEE Photonics Technology Letters, vol. 16, No. 3, pp. 849-851, Mar. 2004.*

(Continued)

*Primary Examiner*—Sung Pak
*Assistant Examiner*—Mike Stahl
(74) *Attorney, Agent, or Firm*—Sughrue Mion, PLLC

(57) ABSTRACT

An optical chromatic dispersion compensation module consists of a portion of fiber (10) comprising a variable pitch Bragg grating and a mechanical structure (1) consisting of two flexible mountings (2, 2') and one fixed mounting (3). The portion of fiber (10) is attached to said mechanical structure (1) at three points: A first soft mount point (5) is connected to the fixed mounting (3) and two rigid mount points (4, 4') are connected to the flexible mountings (2, 2'). The module also consists of a mechanical actuator (20) designed to act on the mechanical structure (1) to compress a first portion of the Bragg grating and to stretch a second portion of the Bragg grating while keeping the central section of the grating fixed. The chromatic dispersion value produced by the Bragg grating filter is thus modified, while its central wavelength remains fixed.

14 Claims, 1 Drawing Sheet

OTHER PUBLICATIONS

Figure 1:
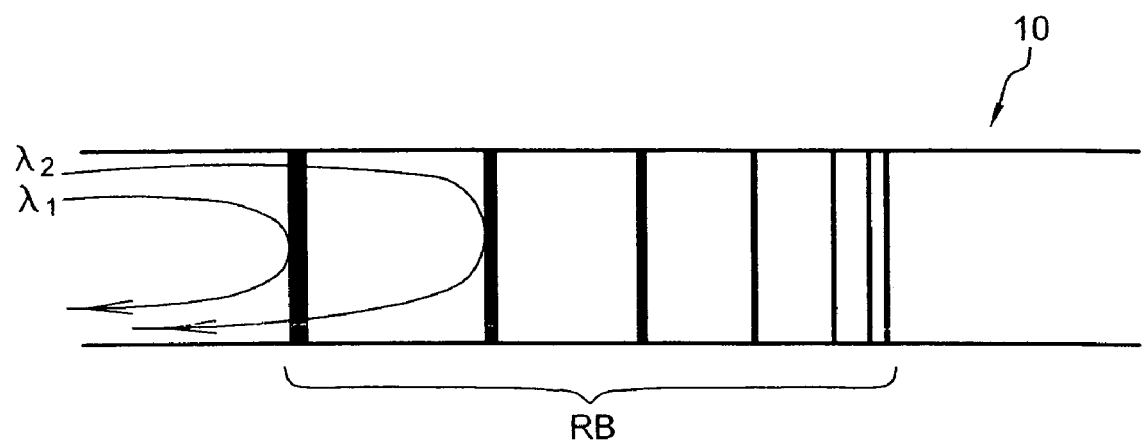

Y. W. Song et al, "Tunable WDM Dispersion Compensation with Fixed Bandwith and Fixed Passband Center Wavelength Using a Uniform FBG", IEEE Photonics Technology Letters, IEEE, Inc. NY, US, vol. 14, No. 8, Aug. 2002, pp. 1193-1195, XP001132245.

D. Garthe et al, "Adjustable dispersion equaliser for 10 and 20 Gbits/s over distances up to 160 km", Electronics Letters, IEE Stevange, GB, vol. 30, No. 25, Dec. 8, 1994, pp. 2159-2160, XP006001444.

* cited by examiner

OPTICAL CHROMATIC DISPERSION COMPENSATION MODULE

The present invention concerns the field of high throughput fiber optic telecommunications. More specifically, the invention applies to a module comprising a Bragg grating filter designed to compensate for the effects of chromatic dispersion and/or the chromatic dispersion slope in a fiber optic link.

Chromatic dispersion occurs on the propagation of short pulses over a large distance through the gradual dispersion of the pulse's group speeds during the propagation.

In wavelength division multiplexing, or WDM, high throughput transmission networks, it is advantageous to manage the chromatic dispersion, in particular for throughputs greater than or equal to 40 Gbit/s or 160 Gbit/s, but also for operations to increase the throughputs of existing links, such as changing a transmission from 2.5 Gbit/s to 10 Gbit/s, for example. The objective, for all multiplexed wavelength values, is to obtain a cumulated chromatic dispersion on the link of roughly zero, in order to limit the spreading of the pulses. According to the WDM technique, a broadband light source is coupled with discrete wavelength division devices and several channels that consequently simultaneously transmit a signal at a given wavelength in the link fiber optic. The chromatic dispersion effects are therefore duplicated for each wavelength transmitted on each channel.

The effects of the chromatic dispersion are cumulated along the length of the link, and owing to this are greater for long links. In addition, the chromatic dispersion causes a temporal spreading of the pulses to be carried along the link (chromatic dispersion slope). Thus, if the pulses are far enough apart in time, the risk of an error on reception is minimized; however, in the case of high throughput systems, the temporal spreading of a pulse may become of the same magnitude as the spacing between the pulses, causing an error rate that is unacceptable for the operator of the link. For example, at around 1.55 µm, the order of magnitude of the temporal spreading of a pulse is 17 ps/nm/km. This deformation results from the fact that at around 1.55 µm, the "high frequency" components of the pulse's spectrum are propagated more quickly than the "low frequency" components, which causes a redistribution of the spectral components during propagation. It is also advantageous to limit the chromatic dispersion slope cumulated over the multiplex's range, in order to prevent or limit distortions between the multiplex's channels. This slope is traditionally the differential coefficient of the chromatic dispersion in relation to the wavelength.

Traditionally, the transmission line fibers used for fiber optic transmission systems are SMF (single mode) fibers or NZ-DSF+ (non-zero dispersion shifted) fibers. To compensate for the chromatic dispersion and the chromatic dispersion slope in SMF or NZ-DSF+ fibers used as transmission line fibers, short DCF (dispersion compensating) fibers are currently used. At a wavelength of around 1550 nm, these existing dispersion compensation fibers present a negative chromatic dispersion and a negative chromatic dispersion slope.

However, the DCF fibers provide an overall chromatic dispersion compensation that does not taken into account differences that may appear at the end of the optical link between the multiplex's various channels. In addition, these DCF fibers cause additional transmission line losses, and for long distance links, this increased attenuation may require the adding of additional amplifiers. Single-channel compensation is therefore necessary, requiring the insertion of specific portions of DCFs for each channel in order to adjust the residual chromatic dispersion, typically of around +/−1000 ps/nm.

Now although DCF fibers offer effective in-line compensation, they are an expensive way of compensating for the residual chromatic dispersion of a wavelength. They require the presence of compensation modules with from a few hundred meters to a few kilometers of DCF fibers. In addition, the compensation effected can only be adjusted by physically changing the module.

Furthermore, it is known from documents EP 1 278 082 and EP 1 283 433 that variable pitch (chirped) Bragg gratings allow chromatic dispersion compensation.

A functional diagram of a variable pitch Bragg grating-assisted chromatic dispersion compensator is illustrated in FIG. 1. Traditionally, the writing of a variable pitch Bragg grating BG in a fiber 10 takes place through a phase mask, whose pitch varies along the fiber's length in order to modify the wavelength reflected by the network according to the position on the fiber. A linear variation of the grating's pitch (as illustrated in FIG. 1) and therefore of the reflection wavelength according to the position on the fiber, may be used to correct the effects of the first-order chromatic dispersion (traditionally known as the chromatic dispersion), and a quadratic variation of the pitch may be used to correct the effects of the second-order chromatic dispersion (traditionally known as the chromatic dispersion slope). The variation in the grating's pitch causes a delay in the reflected wave according to the wavelength, which enables the correcting of the dispersion effects. Such a Bragg grating is usually combined with an optic circulator, as it operates through reflection.

Compensating for the first- and second-order chromatic dispersion, over a broad transmission band, in other words over a plurality of wavelength multiplexed channels, therefore requires either a concatenation of Bragg gratings that each compensate for part of the dispersion effects for a given portion of the spectral band, or the creating of a very long chirped Bragg grating. Such a long Bragg grating is described in the conference publication of OFC'01, PD12, 2001, by J. F. Brennan, E. Hernandez, J. A. Valenti, P. G. Sinha, M. R. Matthews, D. E. Elder, G. A. Beauchesne, C. H. Byrd: "Dispersion and dispersion-slope correction with a fiber Bragg grating over the full C-band". An example is the Hilynx© fixed chromatic dispersion modules produced by the company Highwave Optical Technologies, which are particularly designed for 10 Gbit/s optical links.

Another problem experienced by optical link operators is the change in the chromatic dispersion over time, owing, for example, to climatic variations or the ageing of the optical link.

Such a change requires the adapting of the transmission grating and in particular the dispersion compensators used. This adaptation may be carried out during in-line chromatic dispersion compensation, typically in optical repeaters, or during residual chromatic dispersion compensation, at the end of the transmission line.

An optical link is typically composed of a plurality of fiber optic sections that link a plurality of stations or repeaters in which the optical signals to be propagated are amplified and reshaped before being transmitted to the next section. Traditionally, chromatic dispersion compensators are used in at least certain repeaters spaced regularly in the link. It is not feasible to change the dispersion compensators if there is a climatic change, or if the optical link and the elements of which it is composed age.

Thus, adjustable dispersion compensators have previously been proposed, in other words compensators whose properties may be remotely modified to allow the use of the same compensation device for variable wavelengths.

It is already known that a mechanical and/or thermal action on a portion of optical fiber changes the properties of the grating photowritten on this portion. In particular, the grating's pitch may vary under the effect of a mechanical or thermal action.

An example is the adjustable chromatic dispersion compensator ClearSpectrum™ produced by the company Phaethon, or the TH-TDC compensator produced by the company Teraxion. These compensators are adjustable via thermal effect. A thermal gradient imposes a variation in the written grating's pitch and so modifies the reflected wavelength values.

However, the use of a thermal gradient requires the use of Peltier elements, which consume a lot of energy.

The present invention proposes the creating of an optical chromatic dispersion module tunable for each channel of a DWDM (dense wavelength division multiplexing) network.

The chromatic dispersion compensation module according to the invention is particularly designed to implement residual chromatic dispersion compensation and requires a very low consumption energy supply.

To this end, the invention proposes subjecting a variable pitch Bragg grating to a mechanical action controlled by means of a suitable medium, in order to modify the Bragg grating's pitch and so adjust the chromatic dispersion compensation.

More specifically, the invention concerns an optical chromatic dispersion compensation module comprising:

A mechanical structure consisting of two flexible mountings and one fixed mounting;

A portion of fiber comprising a variable pitch Bragg grating, said fiber portion being attached to the flexible mountings at two rigid mount points, and to the fixed mounting at one soft mount point;

A mechanical actuator designed to act on the mechanical structure to compress a first section and to stretch a second section of the Bragg grating portion of fiber, while keeping the central section of the Bragg grating portion of fiber fixed.

According to one feature, the ends of said Bragg grating portion of fiber are attached to the flexible mountings and a central section of said Bragg grating portion of fiber is attached to the fixed mounting.

According to one feature, the soft mounting is designed to compensate for the stresses exerted on the central section of the Bragg grating attached to the fixed mounting.

According to one feature, the mechanical structure comprises at least two flexion points allowing a deformation of said structure by the mechanical actuator.

According to one embodiment, the mechanical structure is H-shaped, with the fixed mounting making up the central bar of the H and the flexible mountings making up the H's two vertical bars.

According to one embodiment, the actuator is placed parallel to the central bar of the H and acts on the H's vertical branches.

According to one embodiment, the mechanical actuator is a piezoelectric actuator.

According to one feature, the first section of the Bragg grating portion of fiber able to be compressed is the long pitch section of the grating, and the second section of the Bragg grating portion of fiber able to be stretched is the small pitch section of the grating.

The invention also concerns a chromatic dispersion compensation process comprising steps consisting of:

Placing at least one chromatic dispersion compensation module according to the invention on a wavelength division multiplexing (WDM) transmission line;

Measuring a chromatic dispersion;

Controlling the mechanical actuator in order to adjust the compensation of said chromatic dispersion.

According to the embodiments, the mechanical actuator is actuated manually or automatically.

The invention also concerns a system of optical transmission through wavelength multiplexing comprising:

A wavelength division multiplexing (WDM) transmission line;

Chromatic dispersion measuring devices;

At least one chromatic dispersion compensation module according to the invention, designed to adjust the compensation of said measured chromatic dispersion.

According to one application, the chromatic dispersion measuring devices are designed to measure a residual chromatic dispersion for each wavelength transmitted.

According to one application, the chromatic dispersion measuring devices are designed to measure a chromatic dispersion phase-shift during transmission for a given wavelength.

Figure 2:
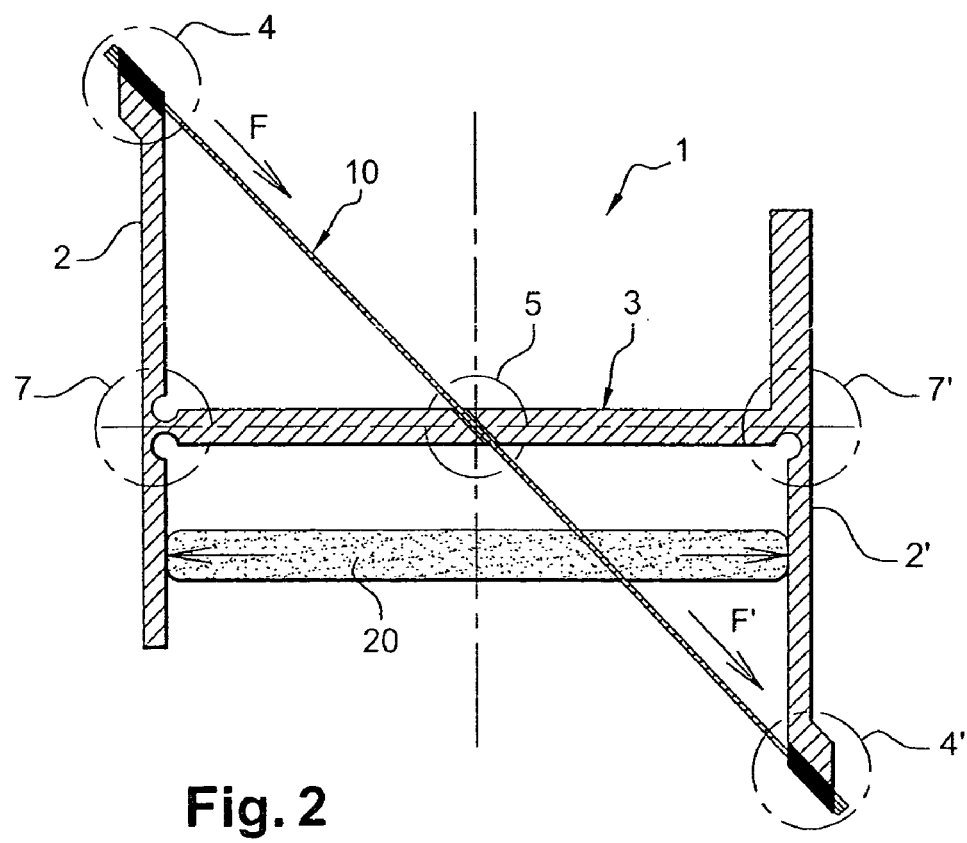

The features and advantages of the invention will become more apparent on reading the description that follows, which is non-limitative and given as an illustrative example, with reference to the figures appended, in which:

FIG. 1, already described, is a functional diagram of a variable pitch Bragg grating-assisted chromatic dispersion compensator operating through reflection;

FIG. 2 is a diagram of an optical module according to the invention.

According to the invention, an optical chromatic dispersion compensation module consists of a portion of fiber comprising a variable pitch Bragg grating and a mechanical structure consisting of two flexible mountings and one fixed mounting. The portion of fiber is attached to said mechanical structure at three points: A first soft mount point is connected to the fixed mounting and two rigid mount points are connected to the mechanical structure's flexible mountings. The module also comprises a mechanical actuator designed to act on the mechanical structure to compress a first portion of the Bragg grating and to stretch a second portion of the Bragg grating while keeping the central section of the grating fixed. The chromatic dispersion value produced by the Bragg grating filter is thus modified, while its central wavelength remains fixed.

We will now refer to FIG. 2 for a more detailed description of the module according to the invention.

The module comprises a mechanical structure 1 consisting of two flexible mountings 2, 2' and a fixed mounting 3. In the embodiment illustrated, the structure 1 has a general H shape. The fixed mounting 3 makes up the central bar of the H and the flexible mountings 2, 2' each make up a vertical lateral bar of the H.

The two flexible mountings 2 and 2' and the fixed mounting 3 preferably form a single, single-piece structure. The material from which the mechanical structure 1 is made may be Invar, or any other material with a low thermal expansion coefficient.

The module also comprises a portion of fiber 10 consisting of a variable pitch Bragg grating, known as a "chirped" Bragg filter. The Bragg grating may present a linear variation of the pitch or a quadratic variation of the pitch, according to the applications envisaged. Such a portion of fiber comprising a photowritten Bragg grating is referred to below as a Bragg filter.

The Bragg filter 10 is attached to the mechanical structure 1 by means of three mount points 4, 4' and 5. The central section of the Bragg grating filter is attached to the fixed mounting 3 of the structure 1 by a soft mount point 5. The ends of the Bragg grating filter 10 are attached to the two flexible mountings 2, 2' respectively of the structure 1 by rigid mount points 4, 4'.

The rigid mount points 4, 4' may be obtained, for example, using glue or glass-metal sealing. Indeed, Bragg filters are currently secured to mechanical structures through an appropriate glue directly placed on the fiber optic. Further information about this point can be found in the publication "Tunable WDM Dispersion Compensation with Fixed Bandwidth and Fixed Passband Center Wavelength using a uniform FBG", by Y. W. Song, D. Starodubov, Z. Pan, Y. Xie, A. E. Willner and J. Feinberg, IEEE Photonics Technology Letters, vol. 14, n°8, 2002.

The soft mount point 5 may be obtained using a soft glue with an appropriate elasticity modulus. This soft mount point 5 must, in fact, be able to compensate for any stress exerted on the central section of the Bragg grating attached to the fixed mounting 3. This soft mount point 5 allows the stretching and compressing of the filter in the central zone and thus prevents the deformation of the Bragg filter's central section. Furthermore, the soft mount point 5 is such that it does not change the optical properties of the Bragg filter 10.

The module also comprises a mechanical actuator 20 designed to deform the mechanical structure 1. The mechanical actuator 20 may be a differential pitch screw or a piezoelectric actuator.

In the embodiment illustrated, there are two flexion points 7, 7' at the points connecting the central bar of the H with the H's vertical bars. These flexion points 7, 7' are designed to allow the rotating of the H's vertical bars around axes passing through the central bar that are perpendicular to this bar. The flexion points 7, 7' remain attached to the mechanical structure 1. The flexion points 7, 7' may be formed from joints or through the appropriate machining of the mechanical structure 1, allowing an elastic deformation of said structure.

According to the embodiment illustrated, the actuator 20 is placed parallel to the central bar of the H of the mechanical structure 1 and acts on the H's vertical branches. The actuator will therefore separate the branches of the H one from the other on the same side of the central bar. This will cause a first flexible mounting 2 to tilt towards the inside of the H, while the second flexible mounting 2' tilts towards the outside of the H.

Consequently, under the action of the actuator 20, the forces F and F' are exerted by the two rigid mountings 2, 2' on the Bragg filter 10. These forces F and F' produced by the mechanical actuator 20 cause the compressing of a first portion of the Bragg filter and the stretching of a second portion of the Bragg filter, while keeping the central section of the filter fixed.

Indeed, the flexible mountings 2, 2' remain attached to the mechanical structure 1 deformed by the actuator 20, whereas the rigid mounting 3 does not undergo any deformation. The rigid mount points 4, 4' pull the ends of the filter 10 jointly with the deformation of the flexible mountings 2, 2', while the soft mount point 5 absorbs the forces exerted on the central portion of the filter attached to the fixed mounting 3.

The Bragg filter 10 is initially tension mounted in the mechanical structure 1. Thus, the compressing of a portion of the Bragg filter takes place through the releasing of the initial stress. This produces a deformation of the filter without discontinuity.

Typically, the mechanical actuator 20 may produce a force such that the compressing and stretching is equal to +0.5% and −0.5% of the length of the Bragg filter 10.

For an application to chromatic dispersion compensation, the compressed section of the Bragg filter is the long pitch section of the "chirp" and the stretched section of the Bragg filter is the short pitch section of the "chirp". For a 50 mm long filter presenting a variable pitch Bragg grating with a "chirp" of around 0.6 nm, a relative modification of +0.1% and −0.1% may cause a modifying of the chromatic dispersion of around +1000 ps/nm and −1000 ps/nm while keeping the central Bragg wavelength fixed.

In addition, the dispersion value may be accurately controlled by means of the actuator. For example, the mechanical actuator 20 may be a differential pitch screw that provides a dispersion adjustment resolution of around 25 ps/nm. The mechanical actuator 20 may be a piezoelectric actuator controlled manually or automatically according to the application. Even in the case of automatic adjustment, the actuator's energy consumption is minimal compared with a Peltier element.

The module according to the invention is used with chromatic dispersion measuring devices that allow a control signal to be transmitted to the actuator in order to adjust the dispersion compensation according to this measurement.

This produces an optical module that is perfectly designed to provide an adjustable compensation of the residual chromatic dispersion over DWDM type transmission lines. Such a module is also designed to allow the adjusting of the chromatic dispersion during transmission for a given wavelength.

Although the invention has been described with reference to a particular embodiment, showing a H-shaped mechanical structure, it should be understood that any other suitable shape allowing the compressing of a first fiber portion and the stretching of a second fiber portion while ensuring that the central section of the filter is not subject to mechanical stresses is covered by the present invention.

The invention claimed is:

1. An optical chromatic dispersion compensation module comprising:

A mechanical structure (1) consisting of two flexible mountings (2, 2') and one fixed mounting (3);

A portion of fiber (10) comprising a variable pitch Bragg grating, said fiber portion being attached to the flexible mountings (2, 2') at two rigid mount points (4, 4') and to the fixed mounting (3) at a soft mount point (5);

A mechanical actuator (20) designed to act on the mechanical structure (1) to compress a first section and stretch a second section of the Bragg grating portion of fiber while keeping the central section of the Bragg grating portion of fiber fixed.

2. A module according to claim 1, characterized by the fact that the ends of said Bragg grating portion of fiber (10) are attached to the flexible mountings (2, 2') and a central section of said Bragg grating portion of fiber is attached to the fixed mounting (3).

3. A module according to claim 2, characterized by the fact that the soft mounting (5) is designed to compensate for the stresses exerted on the central section of the Bragg grating attached to the fixed mounting (3).

4. A module according to claim 1, characterized by the fact that the mechanical structure (1) comprises at least two flexion points (7, 7') allowing a deformation of said structure by the mechanical actuator (20).

5. A module according to claim 1, characterized by the fact that the mechanical structure (1) is H-shaped, the fixed mounting (3) making up the central bar of the H and the flexible mountings making up the H's two vertical bars.

6. A module according to claim 5, characterized by the fact that the actuator (20) is placed parallel to the central bar of the H and acts on the H's vertical bars.

7. A module according to claim 1, characterized by the fact that the mechanical actuator (20) is a piezoelectric actuator.

8. A module according to claim 1, characterized by the fact that the first section of the Bragg grating portion of fiber able to be compressed is the long pitch section of the grating and the second section of the Bragg grating portion of fiber able to be stretched is the small pitch section of the grating.

9. A chromatic dispersion compensation process comprising stages each comprising:

Placing at least one chromatic dispersion compensation module according to claim 1 on a wavelength division multiplexing (WDM) transmission line;

Measuring a chromatic dispersion;

Controlling the mechanical actuator in order to adjust the compensation of said chromatic dispersion.

10. A process according to claim 9, characterized by the fact that the mechanical actuator is manually actuated.

11. A process according to claim 9, characterized by the fact that the mechanical actuator is automatically actuated.

12. A system of optical transmission through wavelength multiplexing comprising:

A wavelength division multiplexing (WDM) transmission line;

Chromatic dispersion measuring devices;

At least one chromatic dispersion compensation module according to claim 1, designed to adjust the compensation of said measured chromatic dispersion.

13. A system according to claim 12, characterized by the fact that the chromatic dispersion measuring devices are designed to measure the residual chromatic dispersion for each wavelength transmitted.

14. A system according to claim 12, characterized by the fact that the chromatic dispersion measuring devices are designed to measure the chromatic dispersion phase-shift during transmission for a given wavelength.

* * * * *